United States Patent [19]

Chartrand et al.

[11] Patent Number: 4,796,558
[45] Date of Patent: Jan. 10, 1989

[54] FOAM FLUXER

[75] Inventors: Raymond J. Chartrand, Kirkland; Carlos A. Deambrosio, LaPrairie, both of Canada

[73] Assignee: Electrovert Limited, Ontario, Canada

[21] Appl. No.: 157,959

[22] Filed: Feb. 19, 1988

[51] Int. Cl.$^4$ .............................................. B05C 5/02
[52] U.S. Cl. ...................................... 118/74; 118/410; 118/429; 228/37
[58] Field of Search .................. 118/74, 410, 429; 228/37, 43

[56] References Cited

PUBLICATIONS

"Electrovert Instruction Manual, No. 020-02-1, Foam Fluxers", 1985.

Primary Examiner—John McIntosh
Attorney, Agent, or Firm—Darby & Darby

[57] ABSTRACT

A foam fluxer for fluxing surface mounted devices on printed wiring boards is suitable for low solids content fluxes. The foam fluxer is for installation in an open tank containing liquid flux positioned under a conveyor path conveying the components. The fluxer comprises an aerator chimney housing with side walls and end walls for placement in and protruding above the open tank, the housing having a top foam outlet for positioning below the conveyor path, at least one vertical internal divider located in the housing below the foam outlet, the divider forming at least two chambers, and a porous aerator tube located in each chamber with connection means for a compressed gas supply to produce foam in each chamber, the foam from each chamber joining above the divider to exit upwards from the foam outlet.

5 Claims, 1 Drawing Sheet

FOAM FLUXER

The present invention relates to fluxing components prior to soldering. More specifically, the present invention provides a foam fluxer suitable for low solids content fluxes used for surface mounted edvices.

Surface mounted devices on printed wiring boards and the like are generally fluxed prior to soldering. In many types of soldering systems, printed wiring boards, and other components requiring soldering, are placed on a conveyor which passes the components through foam flux before proceeding to the solder step. In the case of some surface devices mounted on a printed wiring board, it is preferred to use a flux solution which has a low solids content, sometimes as low as 2.2%. This flux is difficult to foam since the consistency is almost that of pure alcohol or the like.

Foam fluxers presently available include an aerator housing that sits in a tank of foam solution with an open foam outlet at the top of the housing. A single porous aerator tube generally formed as a cylindrical porous stone, with air pumped through the porous stone, produces foam bubbles which rie from the outlet and into the conveyor path so that the components to be soldered pass through the foam. When low solids content flux is used, it is found that the same type of foaming does not occur and, therefore, the foaming has inconsistent bubble size and is erratic across the conveyor path. Attempts to improve the foaming of the flux by increased air pressure results in considerably larger foam bubbles being formed. These large foam bubbles do not provide the fluxing properties that are required. It is preferred to produce a foam which has evenly sized bubbles and also produce foam that does not pulsate in waves with high and low spots appearing across the width of the foam outlet. Furthermore, if the foam velocity from the outlet is too fast, then too much foam is produced and exposed to the air. With the foam having so high a solvent content, this leads to rapid evaporation of the solvent which is wasteful and inefficient.

It is an aim of the present invention to provide a foam fluxer which produces foam flux from low solids content fluxes having a consistent bubble size and even foam flow across the foam outlet.

The present invention provides a foam fluxer for fluxing components conveyed in a conveyor path above the fluxer, for installation in an open tank containing liquid flux, the fluxer comprising: an aerator chimney housing with side walls and end walls for placement in and protruding above the open tank, the housing having a top foam outlet for positioning below the conveyor path, at least one vertical internal divider located in the housing below the foam outlet, the divider forming at least two chambers, and a porous aerator tube located in each chamber with connection means for a compressed gas supply to produce foam in each chamber, the foam from each chamber joining above the divider to exit upwards from the foam outlet.

In embodiments of the invention the foam fluxer has a top foam outlet substantially rectangular in configuration and a center vertical internal divider located in the housing parallel to top edges of the side walls at the foam outlet, dividing the housing into two substantially equal chambers. Porous aerator tubes are located in each of these chambers. In a still further embodiment, the side walls slope inwards from the bottom of the housing so that the foam outlet is considerably smaller than the bottom of the housing.

In drawings which illustrate embodiments of the invention:

Figure 1:
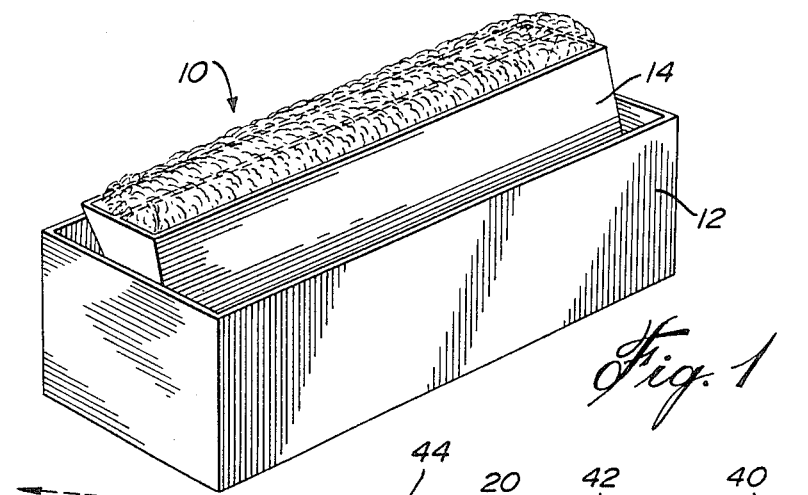
FIG. 1 is an isometric view of a foam fluxer with an aerator chimney housing positioned in an open tank containing liquid flux.
Figure 2:
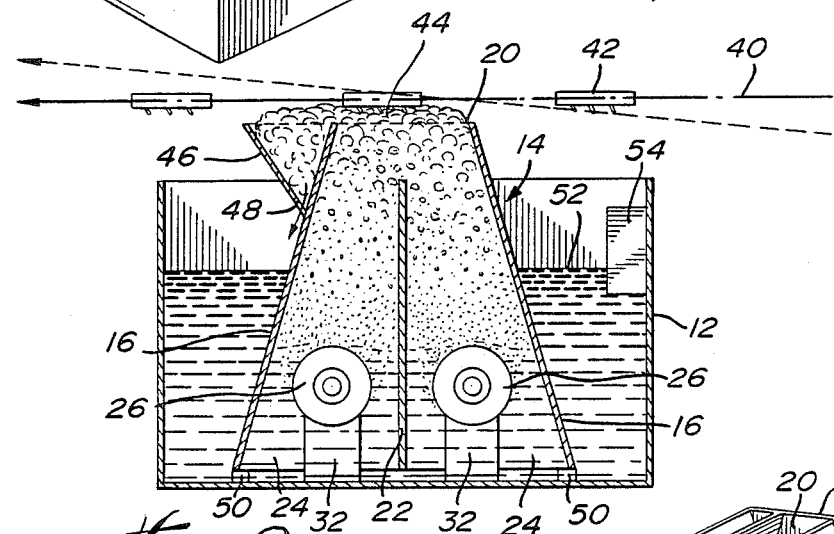
FIG. 2 is a cross sectional view through the foam fluxer shown in FIG. 1.
Figure 3:
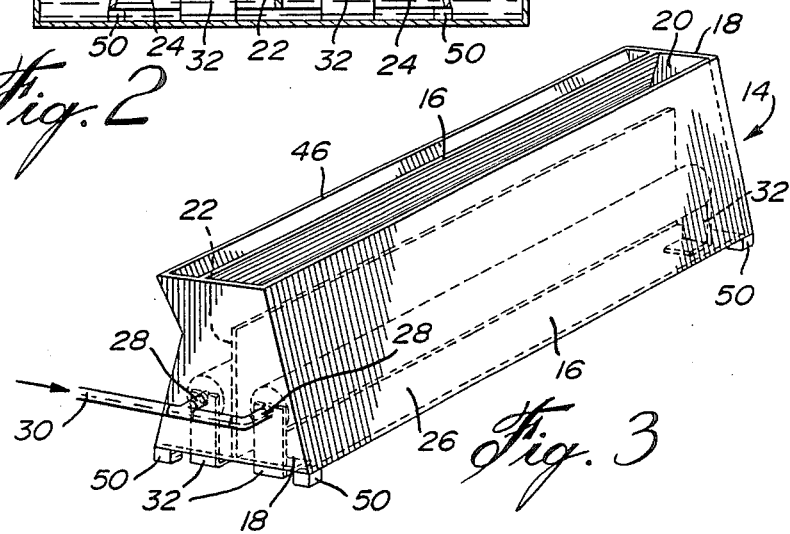
FIG. 3 is an isometric view showing details of the aerator chimney housing with a porous aerator tube located in each of the two chambers.

Referring now to the drawings, FIG. 1 illustrates a foam fluxer 10 having an open tank 12 with an aerator chimney housing 14 positioned therein. As can be seen in FIGS. 2 and 3, the aerator chimney housing 14 has two side walls 16 sloped inwards from the bottom supported by vertical end walls 18 at each end which are trapazoidal in shape to match the ends of the side walls 16. The top of the aerator chimney housing 14 extends up above the open tank 12 and has a top foam outlet 20 which is substantially rectangular in shape. A center vertical divider plate 22 extends between the two end walls 18, dividing the aerator chimney housing 14 into two chambers 24 of substantially the same size.

Two porous aerator tubes 26 extend for the length of the housing 14, each tube 26 positioned in the center of each of the chambers 24 and has end connections 28 to an air supply line 30. Brackets 32 support the aerator tubes 26 at each end, however, these brackets may be incorporated with the end walls 18.

As shown in FIG. 2, a conveyor path 40 conveys components 42, which may be surface mounted devices on printed wiring boards or the like, through foam 44 which flows or bubbles up through the foam outlet 20. The flow of foam is controlled by the air supply 30 to the porous aerator tubes 26. The fow may be controlled both by pressure and air flow to ensure that the bubbles are of a consistent size and foam far enough above the outlet 20 so that the components 42 to be soldered in the conveyor path 40 are covered with foam. The conveyor path 40 can be substantially horizontal or sloped, dependent upon the requirements of the soldering device. A wave extender trough 46 is provided on the exit or downstream side of the housing 14 so that the foam instead of flowing straight back into the tank 12 is retained above the trough 46 thus providing increased foam contact for the components 42 being conveyed in the conveyor path 40. Drain holes 48 are provided at the bottom of the wave extender trough 46 for the solvent and flux to drain back into the tank 12.

Feet or spacers 50 are positioned under the housing 14 so that flux liquid can pass under the housing into the chambers 24 and flow upwards to the aerator tubes 26. The spacers 50 may be replaced by holes or slots in the housing 14 to permit flux liquid to flow upwards to the aerator tubes 26.

The flux level 52 in the tank 12 is preferably above the aerator tubes 26, but below the top of the divider plate 22. A level indicator 54 is shown on the side of the tank 12 so that the level can be maintained by the addition of more flux and/or solvent as required. The top of the divider plate 22 is below the foam outlet 20 from the housing so that foam from both chambers 24 joins together and flows up through the foam outlet 20. The wave extender trough 46 gives increased foam contact with the components 42 to be fluxed and also compensates for a narrow foam outlet 20.

A variety of fluxes may be used with the foam fluxer of the present invention. Conventional fluxes may be obtained in both rozin, resin and organic acid categories. Flux suitable for surface mounted devices requires solids content as low as 2.2% in a liquid solvent which is below the solids content of the more conventional fluxes. This type of flux has a density in the range of 0.7 to 0.8, whereas the conventional fluxes have densities above this.

A test was conducted with a foam fluxer according to the present invention which was substantially 6 inches high and 6 inches wide at the base with two porous aerator tubes in the form of porous stones approximately 1½ inches in diameter. Tests were run by placing the liquid level 52 at distances of ½, 1, 1½ and 2 inches above the top of the porous aerator tubes 26. For the low solids content flux, air pressure was set at 10 PSI, but for the higher solids content fluxes, air pressures were increased to 25 PSI. The higher solids content fluxes require a greater air pressure to produce a given size of foam bubble while the solution in the lower solids content flux evaporate at higher pressure. The air volume was controlled via flow control valves.

Tests were also conducted comparing the foam fluxer according to the present invention with a fluxer having a single stone and no divider plate 22 therein. With the low solids content flux, liquid foam was erratic and inconsistent. The flux level of the foam wave was difficult to control as the flux pulsated in waves with high and low spots appearing across the width of the foam outlet 20. In the tests, the aerator tube 26 was 12 inches long, however, sometimes tubes can be as long as 20 inches and for longer tubes the consistency of flux is even more important. The tests proved that the foam fluxer according to the present invention with two porous aerator tubes 26 therein outperformed the fluxer with a single porous aerator tube. Furthermore, the two porous aerator tube unit provided a smaller foam bubble which was more stable than the larger bubble produced by to the single porous aerator tube unit. The liquid level was found to be less critical with the two aerator tube unit and the flux velocity flowing from the foam outlet 20 appeared slower which resulted in less solvent loss due to evaporation. The two chambers 24 prevented the disruption of foam production in the boundary areas.

Various changes may be made to the embodiments described herein without departing from the scope of the present invention which is limited only by the following claims.

The embodiments of the invention in which an exclusive property or privilege is claimed are defined as follows.

1. A foam fluxer for fluxing components conveyed in a conveyor path above the fluxer, for installation in an open tank containing liquid flux, the fluxer comprising:
   an aerator chimney housing with side walls and end walls for placement in and protruding above the open tank, the housing having a top foam outlet for positioning below the conveyor path,
   at least one vertical internal divider located in the housing below the foam outlet, the divider forming at least two chambers, and
   a porous aerator tube located in each chamber with connection means for a compressed gas supply to produce foam in each chamber, the foam from each chamber joining above the divider to exit upwards from the foam outlet.

2. The foam fluxer according to claim 1 wherein the top foam outlet of the housing has a substantially rectangular configuration, and one center vertical internal divider is located in the housing parallel to top edges of the side walls at the foam outlet, dividing the housing into two substantially equal chambers.

3. The foam fluxer according to claim 2 wherein the center vertical divider extends upwards above the liquid level in the tank, ending below the foam outlet.

4. The foam fluxer according to claim 2 wherein the side walls are sloped inwards from the bottom of the housing.

5. The foam fluxer according to claim 1 wherein a wave extender trough is provided on one of the side walls representing the exit side of the conveyor so that foam exiting from the foam outlet is maintained above the trough to provide increased foam contact for components conveyed in the conveyor path above the fluxer.

* * * * *